Jan. 26, 1965  J. A. BARING  3,167,382
RECORDING APPARATUS
Filed May 16, 1962

INVENTOR.
JOHN A. BARING
BY
ATTORNEY.

United States Patent Office 3,167,382
Patented Jan. 26, 1965

3,167,382
RECORDING APPARATUS
John A. Baring, Golden, Colo., assignor to
Honeywell Inc., a corporation of Delaware
Filed May 16, 1962, Ser. No. 195,186
7 Claims. (Cl. 346—109)

A general object of the present invention is to provide an improved method of and apparatus for identifying the numerous traces in oscillographic recording.

Great difficulty is experienced in interpreting multichannel oscillographic recording because the traces cross each other. Since numerous traces are simultaneously recorded, the oscillographic record obtained frequently resembles a maze of intertwined traces. Consequently the study of oscillographic records frequently is time consumming and tedious because of the necessity first of finding which of the numerous intertwined traces is the subject of a desired study, and the difficulty thereafter of following this particular trace. Additionally, many oscillographic records consist of successive bursts of data in which the traces are so intertwined as to again require close study and examination to identify a particular trace even though identified in a previous burst.

Various arrangements have been proposed in the prior art to overcome this practical difficulty in identifying oscillographic recording traces. One method commonly in use is to divide the recording paper width into strips and limit the excursion of each trace to the width of a strip. This practice of identification by trace position severely limits the resolution of the measurements as well as the number of permissible traces on the recording paper or chart. It is totally unsuitable for many applications which require greater resolution and more traces on the same recording. Thus, in missile applications, for example, it is common to produce 50 traces on a recording chart twelve inches wide.

The identification of traces by printing each of them in a different color or in coding the traces by the superimposition of electrical signal on the galvanometer circuit has also been proposed in the prior art. Each of these trace identification methods, however, are objectionable either as requiring considerable additional equipment which may be mechanical, electrical or electronic in nature, and moreover, leave much to be desired in respect of facilitating the desired identification of each of the numerous traces.

A more practical trace identification method which is being used on many present-day oscillographs involves sequential trace interruption as a method of trace identification. In the practice of this method, each of the traces is interrupted or blanked out successively and repetitively, while recording. Specifically, the traces are interrupted one after another in a predetermined order thus permitting identification of each of the traces to be made by counting the interruptions as they occur in time on the recording chart. While this trace identification method does make it possible to identify each trace, it does involve painstaking and time consuming observation of the intertwined traces. Extreme care in observing the traces is required inasmuch as the absence of a trace from the record whether intentional or accidental must be taken into account.

A specific object of the present invention is to provide a trace identifying method and apparatus which is simple and efficient and which permits a desired simplification in oscillographic trace identification.

In accordance with the present invention, each trace is sequentially interrupted, as above described, and additionally, a number or other character identifying each trace is photographically printed along the side of the recording chart, directly opposite the trace interruption. The identifying number printed is that of the galvanometer associated with the interrupted trace. With this construction, the identification of a trace requires only the steps of flinding the interruption on it and noting the number adjacent to and associated with the particular interruption.

Another specific object of the invention is the provision of such trace identification in oscillographic recording by an arrangement which combines the interruption action and the identifying number generation or production on a single member, thereby insuring coincidence in the interrupting action and in the printing of the associated number on the recording paper.

A more specific object of the invention is to provide an improved trace identifying construction in which fiber optics are utilized in cooperation with a tape bearing the trace identifying number, thereby permitting the number identification to be "piped" around corners and permitting desired simplification in the construction. Desirably, the recording paper and the tape move at equal velocity so that the image of the number piped by the fiber optics moves in coincidence with the paper, thus avoiding any tendency for smearing of the identifying number on the recording chart. This also allows the use of a continuous recording light source for the photographic printing of the trace identifying numbers.

A better understanding of the present invention may be had from the following detailed description when read in connection with the accompanying drawings, in which.

Figure 1:
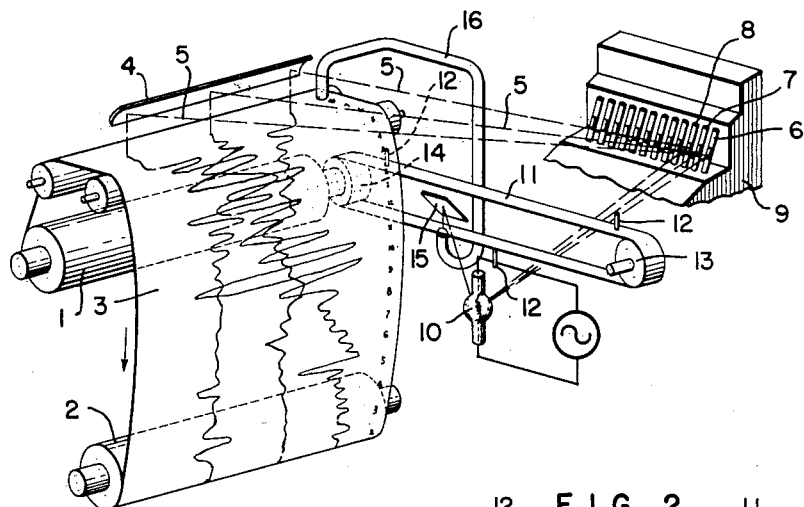
FIG. 1 is a diagrammatic showing of the oscillographic recorder of this invention and of the trace identification method and apparatus which it employs.

The oscillographic recorder illustrated in FIG. 1 includes a housing or compartment, not shown, containing a supply reel 1 and a take-up reel 2 for the roll of sensitive recording paper or chart material 3. An electric motor, not shown, actuates these reels and is controlled by a suitable switch, located on the front panel, not shown, of the oscillograph, as is disclosed, for example, in the application for United States patent, filed on September 8, 1958, by R. S. Kampf, and bearing Serial No. 759,675. It will be apparent that in some cases the take-up reel 2 may not be necessary or desirable, and in such cases the take-up reel 2 may be dispensed with and the recording paper may be permitted to spill out over the table or panel on which the oscillograph is mounted and onto the floor.

In a recording-plane region between the reels, with which a longitudinal beam-deflecting mirror 4 is associated, mirror 4 extending substantially across the width of the recording paper 3, recording paper is exposed to a plurality of recording beams 5 of radiation coming from the respective galvanometers, only three of which, here designated 6, 7 and 8 are illustrated. Desirably, mirror 4 is provided with an elliptical reflecting surface as disclosed in the copending application Serial Number 86,219, filed on January 31, 1961, by Norman L. Stauffer, which is effective to focus each of the galvanometer beams into a spot of high intensity of the recording paper 3 at the recording plane.

Galvanometers 6, 7 and 8 are shown mounted on a galvanometer magnet bank 9 which is practice ordinarily contains 12 galvanometers. It will be understood that any arbitrary number of such galvanometers may be provided, for example, there are three magnet banks containing a total of 36 galvanometers in one apparatus embodiment of the specific oscillograph on which the instant invention is drawn. Each such galvanometer has a small mirror, not shown, deflectable by the associated galvanometer movement, that will reflect the recording beam of radiation 5 from a source 10 to that portion of the sensitive recording paper 3 that is at the time at the recording-plane region 4 between the reel.

The source 10 of radiation is a super-high-pressure-mercury-vapor lamp enclosed in a quartz envelope and is operable to emit a beam of high intensity ultra-violet radiation. An example of such a lamp is the Osram lamp having a 0.012 inch diameter arc, which lamp is manufactured by the Osram Company in West Germany and is identified as their Model HBO-109. The beam of radiant energy from lamp 10 is concentrated by a collector lens, not shown, and is directed by suitable optics, not shown, to each of the galvanometer mirrors of the galvanometers 6, 7 and 8. The galvanometer mirrors, in turn, reflect the radiant energy, in the form of individual beams back to the galvanometer lens and onto the recording paper 3 on the recording plane 4. While not shown, suitable optics desirably is provided between the lamp 10 and the recording paper 3 as illustrated, for example, in the aforementioned Kampf application Serial No. 759,675, for defining each of the separate reflected galvanometer beams into spots of the high intensity on the recording paper.

By way of example and not limitation, one form of recording paper 3 which has been found to be particularly useful in the practice of the present invention is that described in the United States patent application Serial No. 93,289 filed by Troy A. Scott on March 2, 1961, and assigned to the assignee of the present invention. This form of recording paper is sold by the Heiland Division of the said assignee, and is identified as its Part No. A-304796.

Other recording papers which may also be used to advantage in the practice of this invention are those made and sold by Eastman-Kodak Company, and identified as its Kind 1591 and Kind 1592 and that made and sold by E. I. du Pont de Nemours & Co. and identified as its Lino-Writ 5.

The use of such recording paper, referred to in the art as print-out recording paper, gives an immediate image or trace corresponding to the deflections of the recording beams of radiation when the recording beams and recording paper are moving comparatively slow. At higher writing speeds or higher paper transport speeds, a "latent" image or trace is recorded, as in developing-out recording papers requiring wet process developing. This latent recorded image can be "latensified" and thereby made to appear, by exposing, it to room light. The time of such secondary exposure required to make trace visible varies in accordance with the speed of writing in paper transport speeds, but ordinarily is not longer than about a minute. The appearance of the latent image or secondary exposure is known in the art as "latensification." For those applications which do not permit a latensification time delay, as described, even though such time is relatively short, forced latensification may be provided as disclosed in the co-pending application of Roger D. Erickson bearing Serial No. 130,808, filed August 11, 1961. As there disclosed, rapid latensification may be obtained by first exposing the recording paper for a short time to low intensity state of radiation including wavelengths to which the recording paper is particularly sensitive following which high intensity radiation embracing the same wavelengths of radiation may be used to effect the desired rapid latensification without fogging of the recording paper.

Figure 3:
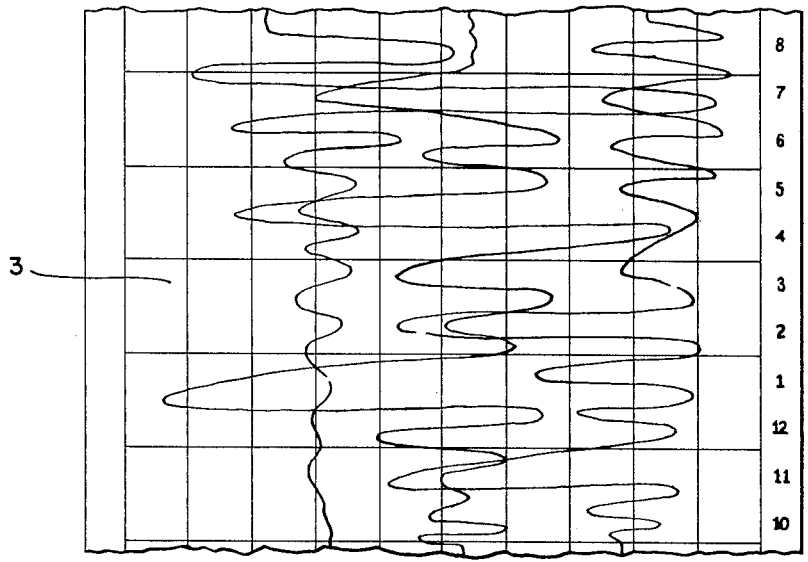
FIG. 3 illustrates a section of recording paper or chart showing a plurality of traces with interruptions and identifying numbers produced in accordance with the present invention.

Such latensification apparatus and the conventional optical and other devices for producing desired timing and grid lines are not shown nor further described since they form no part of the present invention. The present invention, as noted hereinbefore, contemplates a novel method of and apparatus for trace identification involving a sequential interruption of each trace and a positive identification of the interrupted trace by photographically printing an identifying number directly opposite the trace interruption, as illustrated in FIG. 3. By reference to FIG. 3, which for convenience of illustration shows only a few representative ones of the plurality of traces, it is apparent that any one of the traces may readily be identified by relating the trace interruption to the trace number printed on the edge of the chart opposite the interruption. In making this determinaiton, the timing lines conveniently may be used as a guide. This identification procedure not only may be accomplished quickly, but is positive and sure.

As seen in FIG. 1, the apparatus providing the desired sequential trace interruption and simultaneous printing of a trace identifying number includes a belt 11 to which small rods or pins 12 are attached and which interrupt sequentially the radiation from source 10 to each of the galvanometers. Belt 11, as shown, is trained around displaced pulleys 13 and 14, the latter of which is suitably geared to the recording paper supply reel 1 of the oscillograph. The pins 12 are carried on the outer surface of the belt 11. Desirably, several such pins are provided. As the belt 11 moves with respect to the galvanometers in the galvanometer magnet bank 9, the beam of light to each galvanometer is interrupted, in turn, so as to produce a break in the trace produced by each galvanometer on the recording paper 3. These breaks in the traces occur in the same sequence. Inasmuch as the drive mechanism for the belt 11 is geared to the recording paper supply reel 1, the spacing of the trace interruptions remains constant regardless of changes in the paper speed.

Figure 2:
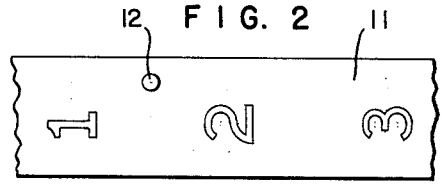
FIG. 2 is a fragmentary view of a portion of the trace identification tape employed in the arrangement of FIG. 1, showing the trace identifying indicia and a trace interrupting pin.

In order to relate or identify each trace with the particular galvanometer producing it, by the break or interruption in the trace, identifying numbers or other indicia to be printed on the recording paper are engraved, as illustrated in FIG. 2, along an edge of the belt 11. The belt 11, one side of which is painted or otherwise suitably made black, desirably may be made of transparent plastic. The identifying numbers or indicia are engraved along one edge through the black paint, providing transparent portions so spaced that each of the said numbers, in turn, is moved adjacent the end of a radiation guide or pipe 16 as each of the rods 12 carried by the belt successively interrupts the radiation to each of the galvanometer mirrors. To that end, a complete set of the identifying numbers or indicia are provided in association with each of the rods 12, being suitably spaced along the belt 11, as necessary for successively transmitting an image of each of the numbers on the belt to the recording paper 3, and to that end has its other end disposed closely adjacent the recording paper 3. The guide 16 desirably may be of a type known in the art under the terminology of "fiber optics," and serves to conduct each of the individual images of the identifying numbers on the belt 11 to the recording paper 3 on which a trace of the identifying number is then produced. The guide 16 may comprise a single rod, for example, of sapphire or glass or it may comprise a bundle of smaller diameter light conducting rods which are suitably held together. The use of such fiber optics permits desirable simplification in the construction inasmuch as it permits the piping of radiation around corners and through tortuous regions which otherwise might be inaccessible because of the presence of other apparatus components.

Inasmuch as the belt 11 and the trace interrupting rods or pins 12 are positively geared together and are driven by the recording paper supply reel 1, it will be apparent that the printing of these identifying numbers on the recording paper 3 will conincide positively with the associated trace interruption. Moreover, it will be apparent that there is little or no tendency for the image of the identifying number being photographed on the paper to smear since the image to be recorded on the belt 11 and the recording paper 3 both move at the same speed. Consequently, the identifying number of the interrupted trace appears sharp and clear on the recording paper 3.

Desirably, three interrupting rods or pins are carried on the belt 11, as illustrated in FIG. 1, to the end that when one pin has completed a sweep of all of the galvanometers interrupting each of the galvanometer beams in turn, the following pin is ready to begin a similar sweep, and so on. Additionally, as illustrated in FIG. 2, the pins 12 desirably are mounted near an edge of belt 11 opposite that carrying the identifying numbers to the end that the pins 12 clear the end of the radiation guide 16 as they pass by. Alternatively, the radiation guide may be arranged to have its ends disposed adjacent the opposite surface of the belt 11 in which case the mirror 15 may be arranged on the other side of the belt and so disposed that the pins 12 may move by without interference.

It will be apparent from the foregoing description that there has been provided, according to the present invention, a novel method and apparatus for interpreting multichannel oscillographic recording which, as noted, often involves a maze of intertwined traces. The construction described combines the interrupting action and the number generation or producing action on a single member, specifically the moving belt, thereby insuring coincidence in the trace interrupting and photographing of the identifying number. The use of fiber optics in the photographing of the identifying number affords a desirable simplification in apparatus since the radiation can be piped around corners and through tortuous passages. The paper and the belt move in synchronism with each other in consequence of which the image of the identifying number moves in coincidence with the paper thereby permitting the use of a continuous light source for printing the identifying number without any tendency for smearing on the recording paper of the identifying number.

What is claimed is:

1. In an oscillograph for recording the time-variations of phenomena under observation, said oscillograph having a recording plane past which a recording medium is adapted to be advanced, and means including a source of radiant energy for forming said radiant energy into a plurality of beams and moving each of said beams along said recording medium at said recording plane so that its position and the trace thereby produced is indicative of the value of one of the related phenomena under observation, means for identifying the traces formed on the recording medium including at least one rod arranged to traverse a forward path in a substantially straight line transversely of said source and each of the means for forming the radiant energy into a plurality of beams and adapted to interrupt in succession the radiant energy from said source to each of the radiation beam forming means, so as successively to cause an interruption in each of said beams and to traverse a reverse path not transversely of said source and the radiation beam forming means and connected to the ends of said forward path, an endless belt carrying said rod and having trace identifying indicia spaced therealong, means spaced apart from each other to support and to advance said endless belt in synchronism with the advancement of the recording medium past the recording plane, and means operative in cooperation with the source of radiation, said endless belt and said identifying indicia to produce and conduct to the recording medium at the recording plane of said oscillograph an image of the associated identifying indicia upon each interruption of a radiation beam by said rod.

2. A combination as specified in claim 1 wherein said means operative in cooperation with the source of radiation, said endless belt and said identifying indicia comprises a radiation conducting guide.

3. A combination as specified in claim 2 wherein one end of said radiation conducting guide is disposed adjacent a surface of said belt and the other end thereof is disposed adjacent said recording plane.

4. A combination as specified in claim 3 wherein said trace identifying indicia comprise spaced radiation transparent portions which successively transmit radiations from said radiation source to said one end of said radiation conducting guide as said rod successively interrupts each of said beams.

5. In an oscillograph for recording the time-variations of phenomena under observation, said oscillograph having a recording plane and means including a source of radiant energy for forming said radiant energy into a plurality of beams and moving each of said beams along said recording plane so that its position is indicative of the value of one of the related phenomena under observation, means for identifying each of the records formed at said recording plane including at least one rod adapted to interrupt in succession the radiant energy from said source to each of the radiation beam forming means, so as successively to cause an interruption in each of said beams, an endless belt carrying said rod and provided with record-identifying indicia spaced therealong, means to support said endless belt for repetitive beam interruption movement of said rod, and means operative in cooperation with said source of radiation and said record-identifying indicia to produce and conduct to the recording plane of said oscillograph an image of the associated identifying indicia upon each interruption of a radiation beam by said rod.

6. A combination as specified in claim 5 wherein said final means element comprises a radiation conducting guide having one end disposed adjacent a surface of said belt and the other end adjacent said recording plane.

7. For use in an oscillograph for recording and identifying the time-variations of phenomena under observation, means forming a plurality of separate radiation beams, means to identify each of said beams including a rod, an endless belt carrying said rod and having trace identifying transparent portions spaced therealong, means to support said endless belt for repetitive beam interruption movement of said rod, and means operative in cooperation with said first mentioned means and said trace-identifying portions to produce a recording image of said identifying portion upon each interruption of a radiation beam by said rod.

References Cited in the file of this patent
UNITED STATES PATENTS 2,254,932    Bryce _____ Sept. 2, 1941
3,081,458    Lee _____ Mar. 12, 1963